United States Patent [19]
Gregg et al.

[11] Patent Number: 5,737,555
[45] Date of Patent: Apr. 7, 1998

[54] METHOD FOR RAPID REPOSITIONING OF A DISPLAY POINTER IN A PREFERRED ORDER

[75] Inventors: Leon Edward Gregg, Rochester, Minn.; William Jaaskelainen, Jr., Austin, Tex.

[73] Assignee: International Business Machines Corporation, Armonk, N.Y.

[21] Appl. No.: 557,406

[22] Filed: Nov. 13, 1995

[51] Int. Cl.$^6$ .................................................. G06F 3/00
[52] U.S. Cl. .................................. 395/339; 345/145
[58] Field of Search ........................... 395/326–358, 395/800; 345/117–120, 145–146

[56] References Cited

U.S. PATENT DOCUMENTS

| | | | |
|---|---|---|---|
| 4,689,761 | 8/1987 | Yurchenco | 364/708 |
| 4,984,152 | 1/1991 | Muller | 395/349 X |
| 5,187,797 | 2/1993 | Nielsen et al. | 395/800 |
| 5,301,348 | 4/1994 | Jaaskelainen | 395/800 |
| 5,335,320 | 8/1994 | Iwata et al. | 395/155 |
| 5,339,392 | 8/1994 | Risberg et al. | 395/161 |
| 5,381,344 | 1/1995 | Rohrbaugh et al. | 364/490 |
| 5,390,131 | 2/1995 | Rohrbaugh et al. | 364/490 |
| 5,400,263 | 3/1995 | Rohrbaugh et al. | 364/490 |
| 5,533,182 | 7/1996 | Bates et al. | 345/145 X |

OTHER PUBLICATIONS

Advanced Interface Design Guide, IBM Corp., pp. 27–33, 66–67, 78–81, 172–174, Jun. 1989.

Foley et al., "Computer Graphics: Principles and Practice", Addison–Wesley Pub. Co., pp. 447–449, 468, 1990.

IBM Technical Disclosure Bulletin, vol. 36, No. 04, Apr. 1993, "Automated Mouse Pointer Movement Function", pp. 433–435.

*Primary Examiner*—John E. Breene
*Attorney, Agent, or Firm*—Timothy W. Markison; Jenkens & Gilchrist; Mark S. Walker

[57] ABSTRACT

A method for rapid positioning of a display pointer on a display screen may be accomplished by establishing a preferred order of display pointer movement between widgets when the particular screen location of the widgets is known. Having established the preferred order, the display pointer is automatically repositioned based on the preferred order when an input stimulus is activated. The input stimulus may be activated by a function of the keyboard, mouse, or any other input devices that may be used in association with a computer.

15 Claims, 3 Drawing Sheets

METHOD FOR RAPID REPOSITIONING OF A DISPLAY POINTER IN A PREFERRED ORDER

TECHNICAL FIELD OF THE INVENTION

This invention relates generally to graphic user interface systems and, more particularly, to a method for rapidly repositioning a display pointer in such graphic user interface systems.

BACKGROUND OF THE INVENTION

A graphic user interface (GUI) provides computer users with an easy and visual means for evoking computer applications without having to remember computer function keystrokes. Such GUI applications allow the user to position a display pointer over a particular widget, click a button, and evoke an application associated with the particular widget. As is known in the computer art, a widget is a graphic symbol displayed on a computer screen that is associated with a particular application. As is also known, windows have a plurality of widgets associated with them. For example, a window may have widgets to shrink the size of the window, grow the window, open or close a file within the window, close the window, scroll a screen on the window, etc.

While widgets allow the user to visually evoke computer applications, or functions, they are activated by moving the display pointer over the particular widget. This may not be easy, especially when the size of the widget is very small. In such situations, the computer user must demonstrate good hand-eye coordination to evoke an associate function of a small widget.

Some text programs have reduced the hand-eye coordination problem for positioning of a text pointer by using tab functions. For example, FileMaker, manufactured by Microsoft Inc., allows a user to select a tab order for entering or reading data from a particular file. Even though such a system allows the user to establish a tab order, it is for a text-based application, not a graphic user interface application.

Therefore, a need exists for a graphics-based method that allows easy movement of a display pointer from one widget to another without the need for a computer user to rely on hand-eye coordination to evoke an associated function, but still benefiting from the advantages of a GUI system.

DETAILED DESCRIPTION OF A PREFERRED EMBODIMENT

Generally, the present invention provides a method for rapid positioning of a display pointer on a display screen. This may be accomplished by establishing a preferred order of display pointer movement between widgets when the particular screen location of the widgets is known. Having established the preferred order, the display pointer is automatically repositioned when an input stimulus is activated.

The input stimulus may be activated by a function of the keyboard, a mouse, or any other computer input device. By repositioning a display pointer in this manner, the computer user does not have to rely on hand-eye coordination to evoke a computer function. The user can simply activate an input stimulus to automatically move the display pointer from one widget to another, which was not an option for the user in prior art graphic user interface systems.

Figure 1:
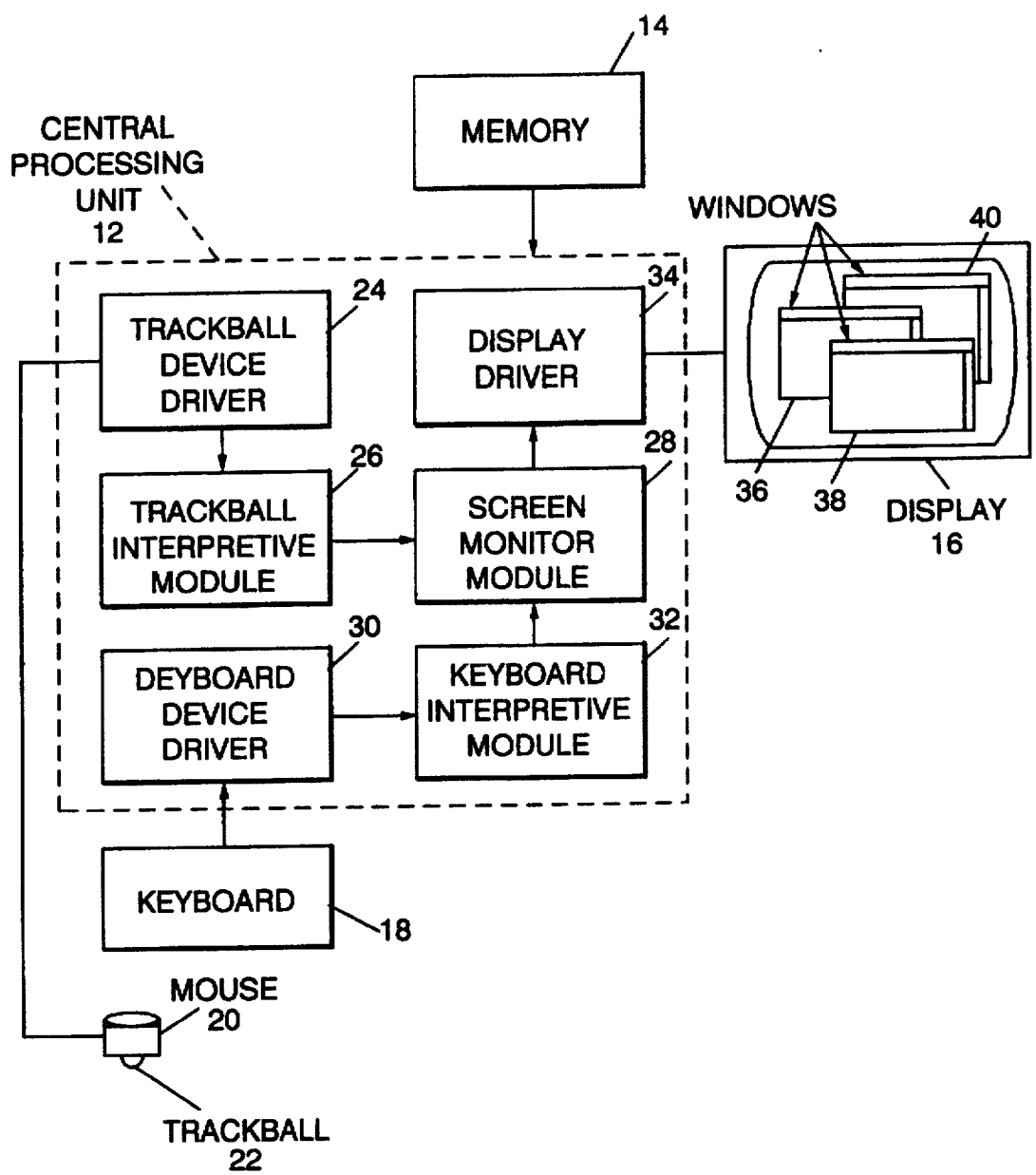
FIG. 1 illustrates a schematic block diagram of a computer system that may incorporate the present invention.

FIG. 1 illustrates a schematic block diagram of a computer system 10 which may be used to support the present invention. The computer system 10 is shown to include a central processing unit 12, memory 14, a display 16, a keyboard 18, and a mouse 20. The mouse 20 includes a tracking ball 22 which is coupled to a track ball device driver 24 within the central processing unit 12. The track ball device driver 24 is coupled to a track ball interpretive module 26 which provides a signal to the screen monitor module 28. The screen monitor module 28 also receives an input from a keyboard interpretive module 32 which receives signals from the keyboard device driver 30. The screen monitor module 28 provides signals to the display driver 34 which in turn drives the display 16. Each of these elements are well known in the art; thus, no further discussion will be presented other than to further illustrate the present invention.

Figure 2:
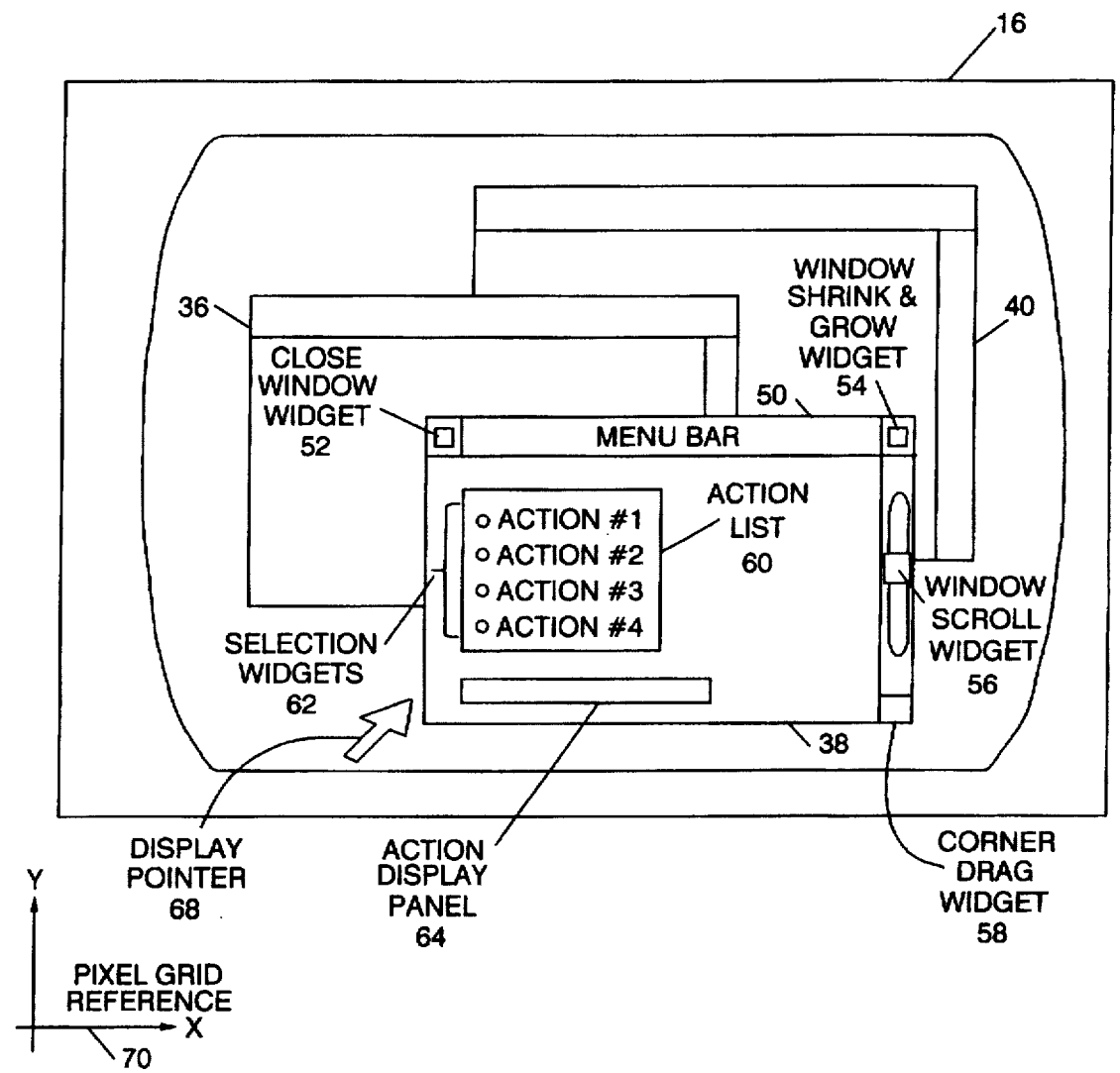
FIG. 2 illustrates the display screen of FIG. 1 that includes a plurality of windows and associated widgets.

FIG. 2 illustrates the display screen 16 showing three windows 36, 38, 40. As shown, window 38 is in the forefront of the screen with windows 36 and 40 in the background. Thus, window 38 is the active, or current, window and is shown to include a menu bar 50 and a plurality of widgets 52, 54, 56, 58, 62. Window 38 also includes an action list 60 and an action display panel 64. As is generally known, when one of the action items of action list 60 is selected, via its associated selection widget 62, that particular action is displayed in the action display panel 64.

Also shown in FIG. 2 is a display pointer 68 which may be controlled via a mouse, or other input stimulus. In prior art applications, the user would have to position the display pointer 68 over a particular widget in which the user wanted to evoke the associated application. For example, assume that the user desires to select action 2 from the action list 60. In such a situation, the user would have to position the display pointer 68 over the selection widget 62 for action number 2. As shown, the associated widget is relatively small, thus the user would have to focus rather intently to get the point of the display pointer 68 in a close enough position to action number 2 to select the associated function.

In contrast, the present invention allows the user to select an order of widget application. For example, assume that the user selected a preferred widget order to be the widgets 62 for action items 1 through 4, followed by the shrink or grow widget 54, the window scroll widget 56, the corner drag widget 58, and finally, the close window widget 52. Thus, given the shown positioning of the display pointer 68, when the user activates some input stimulus, say chording (pushing two buttons of a mouse simultaneously), causes the display pointer to automatically reposition to the selection window associated with action 1. If the user activates the input stimulus again, the display pointer automatically repositions itself to the selection widget 62 associated with action item number 2. As the user continues to activate the input stimulus in this manner, the display pointer will automatically reposition itself through the preferred order established by the user.

Figure 3:
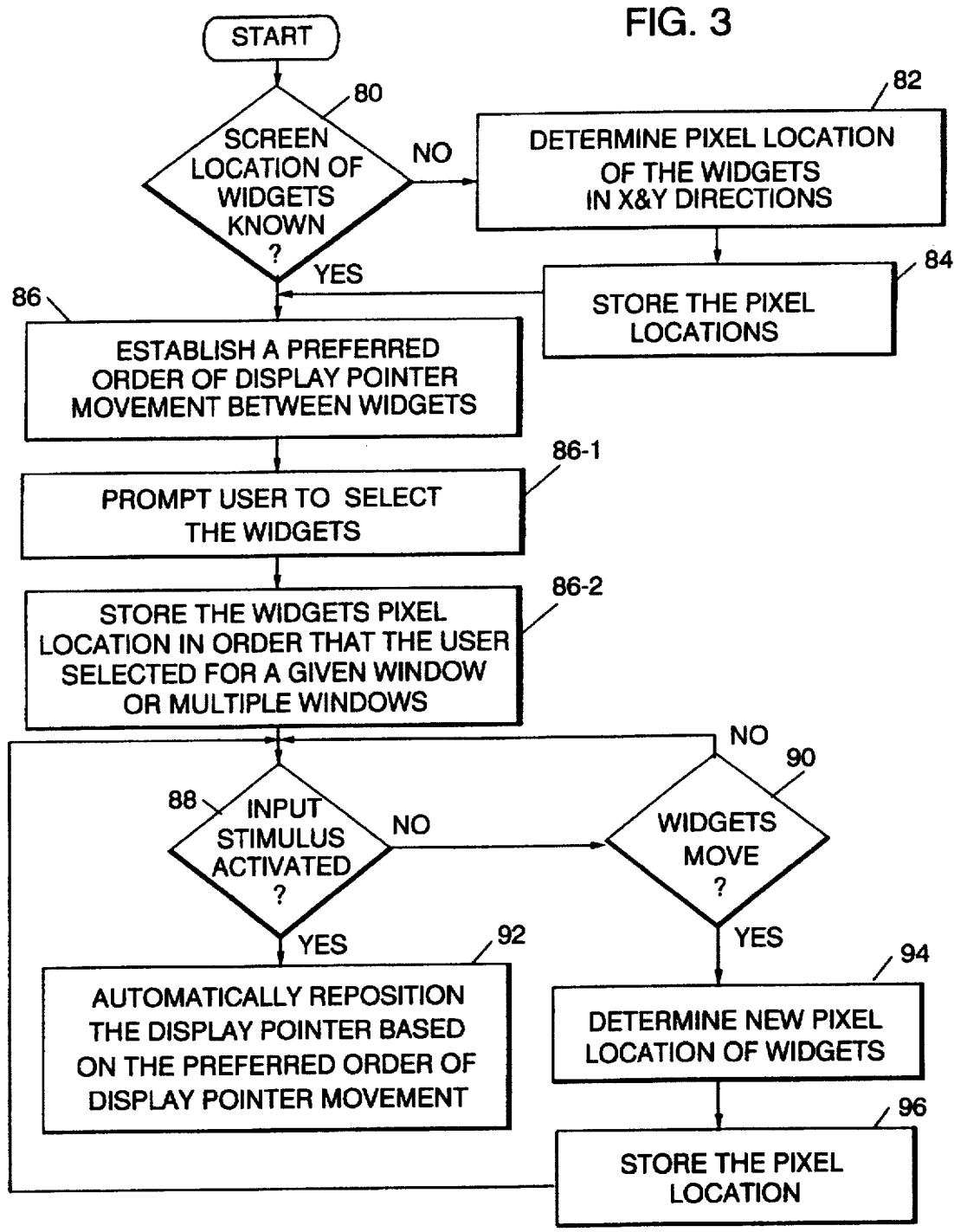
FIG. 3 illustrates a logic diagram that may be used to implement a method in accordance with the present invention.

FIG. 3 illustrates a logic diagram that may be used to implement a method for automatically repositioning a display pointer. The steps of this method may be stored on any computer readable storage medium, such as memory 14 (of FIG. 1), a computer disk, RAM, ROM, magnetic tape, Cds, or any other means for storing digital information. The process begins at step 80 wherein a determination is made as to whether the screen location of the widgets are known. If not, the process proceeds to step 82 wherein the pixel locations of the widgets is determined in X and Y directions. As is known, a typical computer display screen is comprised of a plurality of widgets organized in X and Y directions. Based on X and Y coordinates of the display screen, a particular pixel location can be determined as is generally understood in the art to be performed by the screen monitor module 28 of FIG. 1. Once the pixel locations of the widgets is known, it is stored as shown in step 84.

Once the screen locations of the widgets are known, the process proceeds to step 86 wherein a preferred order of display pointer movement between widgets is established. This may be established by prompting the user to select the particular widgets he or she desires to be in the preferred order. This is shown at step 86-1. The process then proceeds to step 86-2 wherein the widget's pixel location is stored in the order that the user selected the given widget. The widget order, or preferred order, of display pointer movement, may be associated with one window, as was described with reference to FIG. 2, or a plurality of windows. Further, the user may select widgets that are associated with particular icons for different applications.

Having established the preferred order, the process proceeds to step 88 wherein the process determines whether an input stimulus has been activated. As mentioned above, the input stimulus may be chording the mouse, or any other means for inputting a command function to the central processing unit. If the input stimulus is not activated, the process proceeds to step 90 where the process determines whether the widgets have moved. As is known with graphic user interface systems, the user may reposition windows, widgets, icons, etc., anywhere upon the display screen.

When a widget or widgets are moved as determined by step 90, the process proceeds to step 94 wherein the new pixel location of the widgets are determined. Having determined the new pixel location, that information is stored at step 96, and the process returns to step 88. If, however, the widgets did not move, the process waits either for an input stimulus to be activated or a widget to be moved.

When the input stimulus is detected, or activated, the process proceeds to step 92. At step 92, the display pointer is automatically repositioned on the display based on the preferred order of the display pointer movement. As mentioned above with referenced to FIG. 2, when the user activates the input stimulus, the display pointer 68 jumps from the selection widget 62 for the first action item to the selected widget 62 of the second action item, and so on in the order established by the user.

The present invention provides a method for rapid repositioning of a display pointer. With such a method, a user of a graphic user interface system can automatically reposition a display pointer upon a widget with a simple input stimulus as opposed to having to visually position the display pointer over such a widget. Thus, when widgets are small and placing the display pointer over such a widget is difficult, the present invention eliminates such difficulties.

What is claimed is:

1. A method for rapid positioning of a display pointer on a display screen, the method comprising the steps of:

a) based on known screen location of widgets, establishing a preferred order of display pointer movement between at least some of the widgets; and b) automatically repositioning the display pointer based on the preferred order of the display pointer movement when an input stimulus is activated.

2. The method of claim 1, wherein the known screen locations of the widgets are determined by:

determining pixel location of the widgets in an x-direction and a y-direction on the display screen; and storing the pixel location as the known location of the widgets.

3. The method of claim 1, wherein the input stimulus is activated by:

responding to a chording function on a computer mouse.

4. The method of claim 1, wherein the input stimulus is activated by:

responding to a single function button on a computer mouse.

5. The method of claim 1, wherein the predetermined order is established by:

prompting a user to select the at least some of the widgets; and storing each of the at least some of the widgets in an order selected by the user.

6. The method of claim 5 further comprises prompting the user to select the at least some of the widgets from a current window displayed on the display screen.

7. The method of claim 5 further comprises prompting the user to select the at least some of the widgets from several application icons displayed on the display screen.

8. A computer readable storage medium for storing program instructions that, when read by a computer, causes the computer to rapidly position a display pointer on a display screen, the computer readable storage medium comprising:

first storage means for storing program instructions that cause the computer to, based on known screen location of widgets, establish a preferred order of display pointer movement between at least some of the widgets; and second storage means for storing program instructions that cause the computer to automatically reposition the display pointer based on the preferred order of the display pointer movement when an input stimulus is activated.

9. The computer readable storage medium of claim 8, wherein the first storage means further comprises, to determine the known screen locations, the functions of:

storing program instructions that cause the computer to determine pixel location of the widgets in an x-direction and a y-direction on the display screen; and storing program instructions that cause the computer to store the pixel location as the known location of the widgets.

10. The computer readable storage medium of claim 8, wherein the second storage means further comprises, to activate the input stimulus, the function of:

storing program instructions that cause the computer to respond to a chording function on a computer mouse.

11. The computer readable storage medium of claim 8, wherein the second storage means further comprises, to activate the input stimulus, the function of:

storing program instructions that cause the computer to respond to a single function button on a computer mouse.

12. The computer readable storage medium of claim 8, wherein the first storage means further comprises, to establish the preferred order, the functions of:

storing program instructions that cause the computer to prompt user to select the at least some of the widgets; and storing program instructions that cause the computer to store each of the at least some of the widgets in an order selected by the user.

13. The computer readable storage medium of claim 12, wherein the first storage means further comprises storing program instructions that cause the computer to prompt the user to select the at least some of the widgets from a current window displayed on the display screen.

14. The computer readable storage medium of claim 12, wherein the first storage means further comprises storing program instructions that cause the computer to prompt the user to select the at least some of the widgets from several application icons displayed on the display screen.

15. A computer system comprising:

a display screen;

an input device;

a central processing unit that includes:

an input device driver operably coupled to the input device;

an input device interpolation module operably coupled to the input device driver;

a screen monitor module operably coupled to the input device interpolation module;

a display screen driver operably coupled to the screen monitor module and the display screen;

memory that operably coupled to the central processing unit, wherein the memory includes:

first storage means for storing program instructions that cause the central processing unit to, based on known screen location of widgets, establish a preferred order of display pointer movement between at least some of the widgets; and second storage means for storing program instructions that cause the central processing unit to automatically reposition the display pointer on the display screen based on the preferred order of the display pointer movement when an input stimulus is activated.

* * * * *